July 27, 1954 A. PASVEER 2,684,941
METHOD AND APPARATUS FOR AERATING LIQUIDS
Filed Nov. 28, 1949 4 Sheets-Sheet 1

Inventor:
AALE PASVEER,
By: Hugh A. Kirk
His Attorney

July 27, 1954

A. PASVEER 2,684,941

METHOD AND APPARATUS FOR AERATING LIQUIDS

Filed Nov. 28, 1949

Inventor:
AALE PASVEER
By: Hugh A. Kirk
His Attorney

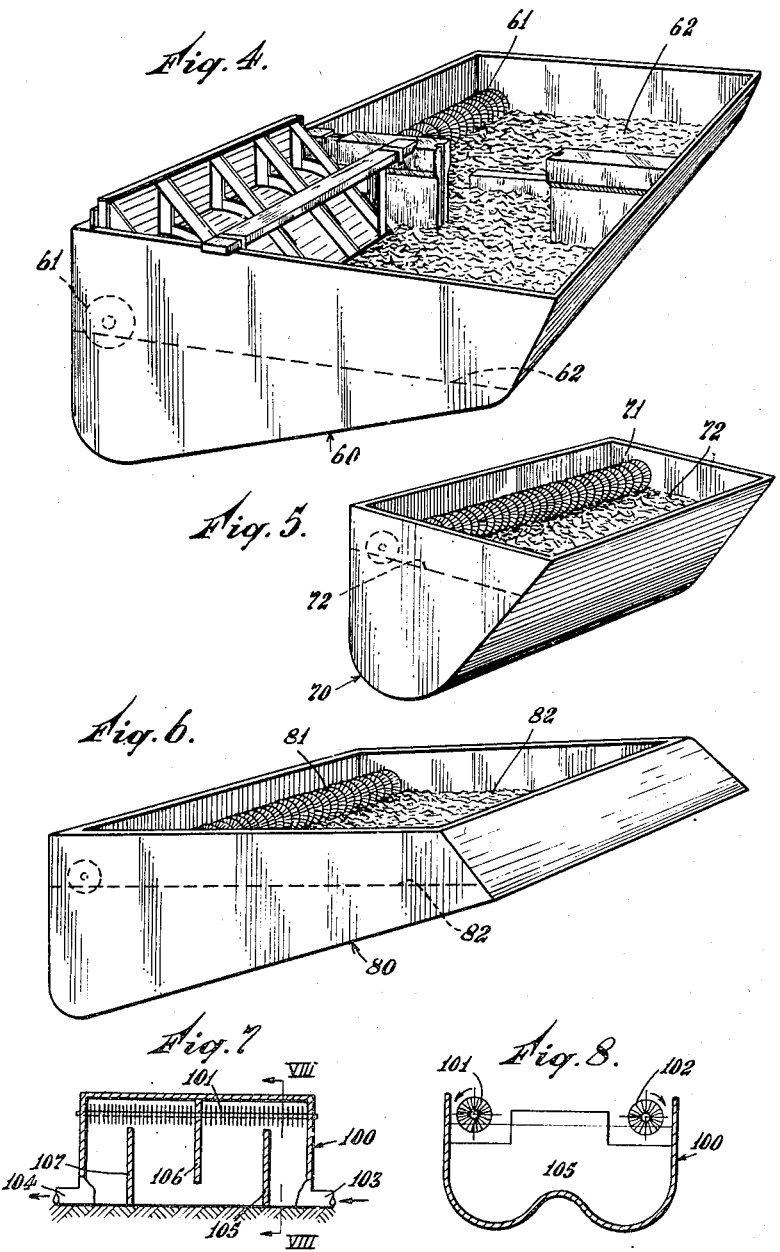

July 27, 1954            A. PASVEER            2,684,941
METHOD AND APPARATUS FOR AERATING LIQUIDS
Filed Nov. 28, 1949            4 Sheets-Sheet 4
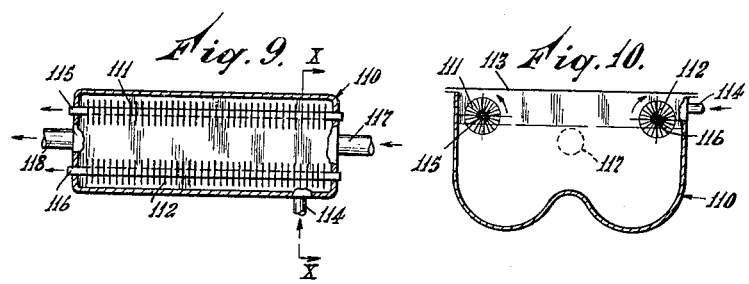
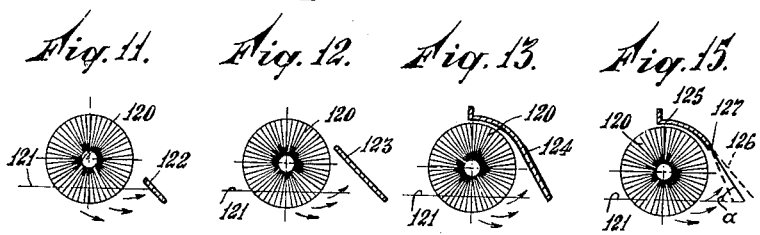
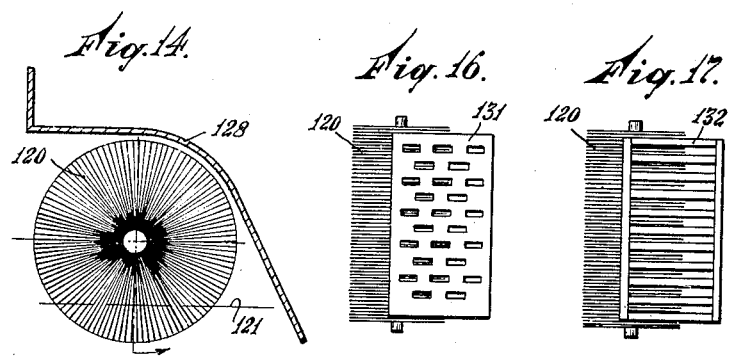
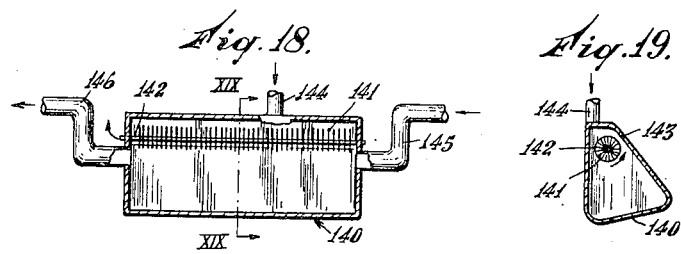
Inventor:
AALE PASVEER
By: Hugh A. Kirk
His Attorney Patented July 27, 1954

2,684,941

UNITED STATES PATENT OFFICE 2,684,941

METHOD AND APPARATUS FOR AERATING LIQUIDS

Aale Pasveer, Scheveningen, Netherlands, assignor to Nederlandse Centrale Organisatie voor Toegepast - Natuurwetenschappelijk Onderzoek, The Hague, Netherlands, a corporation of the Netherlands Application November 28, 1949, Serial No. 129,778

Claims priority, application Netherlands December 2, 1948

15 Claims. (Cl. 210—8)

This invention relates to a new method and apparatus for aerating liquids. More particularly, it deals with an improved method and apparatus for the mixing of a gas in a liquid such as for example in the sewage according to the activated sludge process.

This activated sludge process deals with the removal of the fine material, colloidal material and dissolved organic compounds which remain in sewage after it has had the large materials and substances removed by screening and/or gravitational settling. These fine, colloidal and dissolved materials are formed from tissues which have been broken down by disintegration and putrefaction and comprise carbohydrates, cellulose and its derivatives, proteins such as albumin, mucin, algal matter, etc. and their derivation products such as amines and ammonia and various mineral substances as well as bacterial life and live protozoa which feed on such matter.

However, when oxygen or air is bubbled through this sewage a chemical and/or biological action takes place, which causes these substances to unite or cohere to form a floc which readily settles, and also causes the bacterial life to grow and reproduce feeding on the protectants of the colloids so that they will be decomposed into carbon dioxide and methane and unharmful soluble products and products easily precipitated.

Such treatment is known in the art as "activated sludge" and the operation of subjecting sewage to aeration and agitation is known as "activation". Thus, by separating and recirculating at least a part of the flocculated activated sludge produced in the process to fresh raw sewage to be activated, a continuous purification of the water of the sewage is obtained, sufficient so that the water has at least 90% of its B. O. D.5 content removed and said water may be discharged into adjacent rivers, streams and canals without harmful effects.

The "B. O. D.5" content is the biochemical oxygen demand in 5 days which is measured in grams of oxygen consumed in 5 days at 20° C., by the biochemical oxidation of organic matter present in a cubic meter of raw sewage water, under conditions where an excess of oxygen is continually present during the five days treatment (see "Standard Method for Examination of Water and Sewage" published in the journal of the "American Public Health Ass'n", 9th edition, 1946, pages 139–143).

Previously, such activated sludge treating processes in sewage disposal plants have required large aeration tanks into which the air has been bubbled under pressure or mixed in by a Kessener brush (see German Patent No. 680,099) rotating through the surface of the water in the tank, in which tanks the water to be treated must be agitated and aerated for a period from three to six hours, before 90% of its B. O. D.5 content has been removed. For the disposal of sewage from any sizable populated area, such a plant requires considerable space and tankage, in that Karl Imhoff in his "Taschenbuch der Stadtentwässerung", 11th edition, 1947, page 155, states that activated sludge removes on an average only about 500 grams of B. O. D.5 per 24 hours per cubic meter of volume of an aeration tank, and that an average of 35 grams B. O. D.5 is present in pre-settled sewage per inhabitant per day. This means that, for a tank working 24 hours a day, about $$\frac{500}{35}=14$$

inhabitant equivalents of sewage may be treated per cubic meter of tank. Although, this average figure in certain instances in the Netherlands has been raised to 20 inhabitant equivalents, to treat an amount above this figure would not remove at least 90% of its B. O. D.5 content as is required to maintain public health conditions (see "Sewage Works Journal," 15, 1943, page 1069).

In the activated sludge treatment or in the "activation" of sewage, two operations are involved; first, the adsorption of the impurities on the activated sludge flocs, and second, the oxidation of the impurities by the micro-organisms in the biological floc by means of the oxygen supplied during the aeration of the liquid. Now it has been discovered that the first or adsorption operation only takes about one minute, and the second or oxidation for destruction of the adsorbed products also is comparatively rapid, but what has taken the time in previous processes was the long time spent in getting the oxygen from the atmosphere to the aqueous suspended flocs before it could react with these products.

Accordingly, it is an object of this invention to increase the speed at which a gas can be admixed thoroughly in a liquid without an increase in the consumption of power required to perform the operation, such as for example, to increase the speed, efficiency and effectiveness of activated sludge treating processes for the purification of sewage.

Another object is to increase the turbulence and simultaneously increase the gaseous transfer to a liquid in a treating tank without increasing the power consumption for said tank over what has been employed previously to obtain the same treating results.

Another object is to reduce the time for the treatment of raw sewage with activated sludge from at least three hours to less than one hour and still remove at least 90% of the B. O. D.₅ content of said sewage.

Another object is to provide an aeration system which will treat the same amount of liquid as previous systems but with less tankage and ground area and with about the same amount of power consumption, such as for example, in plants for the aeration treatment of sewage.

Another object is to provide a simple, efficient, effective and economic type, size and shape of liquid aeration treating tank for liquids which permits a high degree of turbulence of the liquid therein.

Another object is to provide a simple, efficient, effective and economic apparatus for rotating brush type of aerators for liquid treating tanks, which increases the amount of gas which is beaten into the liquid by such brush aerators as well as reduces the ice-formation around such brush aerators in winter and reduces the contamination of the surrounding atmosphere due to the mist created by such brush aerators.

In accordance with this invention, the contaminated water or sewage to be treated, is first pre-settled to remove the large materials in the sewage and then the sewage or remaining liquid is thoroughly and turbulently mixed with activated sludge and an oxygen containing gas in either an open or closed treating tank, for a period not more than about one hour, preferably by means of a cylindrical rotating brush-type aerator (such as of the Kessener type) and then the activated sludge and particles adhering thereto are separated from the liquid, such as by settling, and at least a part of the separated activated sludge in suspension is returned to fresh pre-settled sewage for further treatment, while the remaining clear water is decanted off and discharged as having at least 90% of its B. O. D.₅ content removed. The speed at which this process is able to be effectively completed is obtained by decreasing the relative size of the aerating tank with respect to the diameter of the rotating cylindrical brush and/or by increasing the peripheral speed of the brush to produce continued turbulence of the liquid throughout all portions of the tank. This permits an increased amount of activated sludge and oxygen content to be mixed in the sewage so that the time required for the oxygen to get to the floc particles is materially reduced. This result is improved by the employment of a baffle adjacent the brush against which baffle the water and air is projected by the brush, the impact with which, increases the mixing and the content of the gas or oxygen beaten into the water.

The above mentioned and other features and objects of this invention and the manner of attaining them will become more apparent and the invention itself will be best understood, by reference to the following description of specific embodiments of the invention taken in conjunction with the accompanying drawings, wherein:

Fig. 4 is a perspective view of a preferred embodiment of a two chamber aeration tank according to this invention showing the relative size of the tank with respect to the brush, and also showing a baffle in place over the brush in one chamber of the tank;

Figs. 5 and 6 are schematic perspective views of other forms of aeration tanks employing rotating brushes, also showing the approximate relative size of the tank to the diameter of the brush, as well as the form of the tanks which may be used;

Figs. 7 and 8 are schematic diagrams in vertical cross-section of the side and the end, respectively, of a modified form of aeration tank in which two rotating brushes may be employed along opposite sides of the tank;

Figs. 9 and 10 are schematic diagrams in plan with cover removed and in vertical cross-section, respectively, of a closed type of aeration tank similar to that in Figs. 7 and 8;

Figs. 11, 12, 13, 14 and 15 are schematic end views of rotating aerating brushes of the Kessener type showing different forms of baffles which may be used in connection therewith;

Figs. 16 and 17 are plan views of different types of apertured baffles for rotating brushes which may be used in any one of the forms shown in Figs. 11 through 15 and Figs. 18 and 19 are schematic vertical cross-sectional views of the side and end of a closed type of aeration tank in which one wall of the tank may also act as a baffle for the rotating brush.

Figure 1:
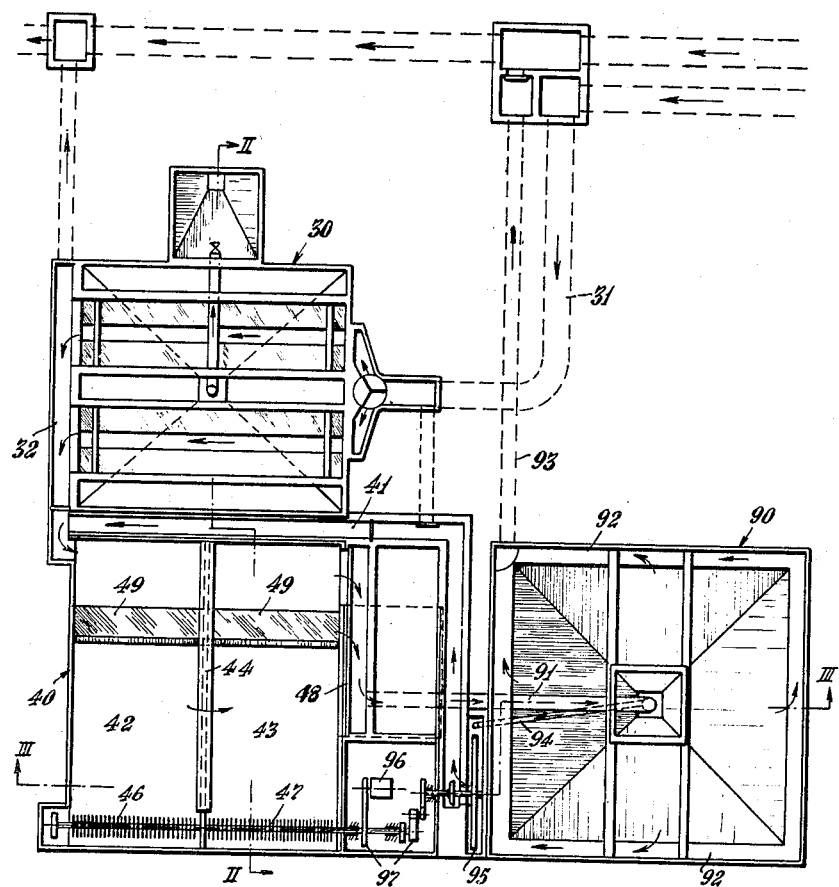
Fig. 1 is a schematic plan view of a sewage purification plant of the activated sludge type.

Referring to Fig. 1, there is shown schematically the plan view of a sewage disposal plant equipped for operation according to an activated sludge treating process. The sewage to be treated or purified enters the pre-settling tank 30, such as of the Imhoff type, through the duct 31 and after the large material and substances have settled out by gravity in the tank 30, the liquid sewage is decanted off and flows through flume 32 into the first chamber of the aeration tank 40. However, before the raw sewage enters the aeration tank 40 it may be admixed with activated sludge suspended in water or sewage recycled through flume 41. The tank 40 may be divided into two equal chambers 42 and 43 by a partition 44, which chambers may communicate with each other through an aperture 45 in said partition 44.

Two aligned rotating cylindrical brushes 46 and 47 are mounted along one side which is a vertical side of the tank 40. These brushes dip into the surface of the liquid in the tank to beat the atmosphere above the surface of the liquid, such as air or oxygen, into the liquid, and keep the liquid in motion in the tank with the sludge. Such brushes may be made of wire or may be axles or drums provided with many radially extending teeth, which when rotated in the surface of the water form a foam. A preferred type of rotating brush for this purpose is described in the German Patent to Kessener No. 680,099, edited August 22, 1939.

Figure 2:
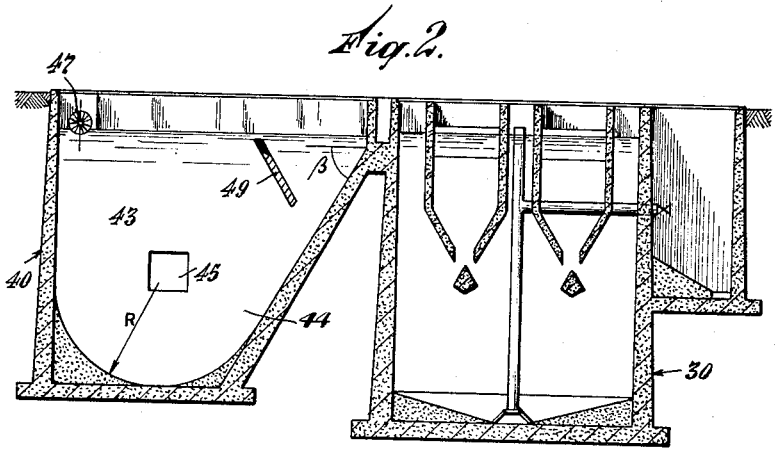
Fig. 2 is a vertical section taken along line II—II in Fig. 1.

Previously, the relative diameter of such brushes to the cross-sectional area of such tanks was comparatively small and is indicated in Fig. 2 of a prior art form of tank 40. In such tanks the brushes were only rotated sufficiently to keep the sludge suspended in the liquid being treated or from settling; since the sludge is not heavy but is light and flocculent, it did not take much speed of rotation of the brushes 46 and 47 to keep the liquid and sludge in the tank in motion. Oftentimes baffles were provided in the tank to direct the current of the liquid around the tank in layers to aid in keeping the sludge in suspension, but no turbulence in the liquid was produced and very little chance was obtained for a change of the layers of oxygen containing water around any particle of sludge except at the time it passed through the rotating brushes 46 and 47. Thus in the tank itself, it took a comparatively long time for oxygen, beaten into the water by the brushes 46 and 47, to reach the comparatively non-changing layers of liquid around the particles as these layers circulated around in the tank. Such layers, however, are not produced when turbulent motion is provided in accordance with the process of the present invention and the tank is continually filled with continuously changing eddys.

Figure 3:
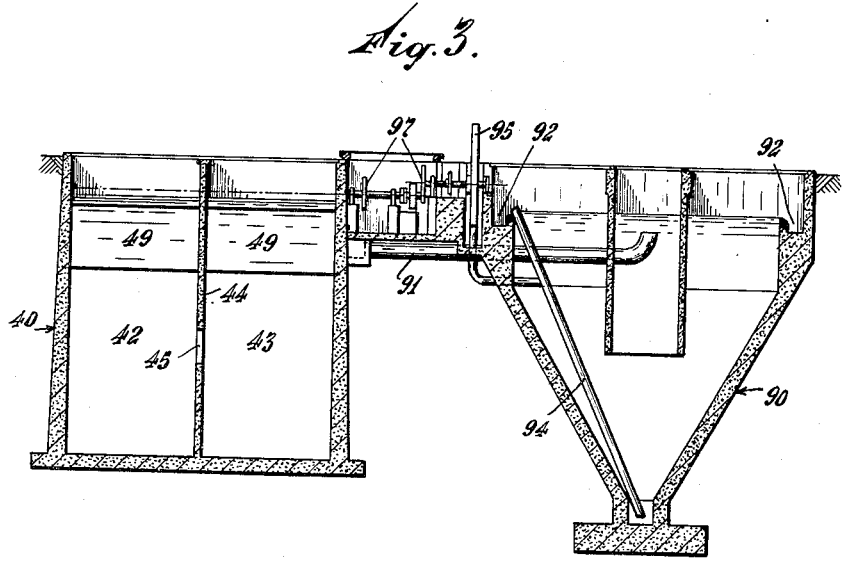
Fig. 3 is a vertical sectional view taken along line III—III of Fig. 1.

This result is obtained by reducing the relative size of the tank with respect to that of the diameter of the brush, by replacing the tank 40 in Figs. 1, 2 and 3 by one of the tanks and brushes shown in perspective in Figs. 4, 5 or 6. In these figures, several different shapes of tanks 60, 70 and 80 are shown, however, the preferred form is shown in Fig. 4, in that the shapes shown in Fig. 5, and particularly Fig. 6, require a greater power consumption for rotating of the brush to produce the necessary amount of turbulence and eddys in the liquid in the tank. Preferably no baffles are provided submerged in the tanks themselves, in that it is not desired to direct the liquid around the tank in layers which form a comparatively dead spot in the center of the tank, but to produce as many counteracting eddy currents as possible in all parts of the tank.

In these Figures 4, 5 and 6 the brushes 61, 71 and 81, respectively, preferably dip into the surfaces 62, 72, or 82 of the liquid in the tank, less than about half the diameter of the brush, and preferably about one quarter of the diameter of the brush. In the apparatus according to this invention, the relative vertical cross-sectional area of the brush with respect to that of the tank, as shown in Figs. 4, 5 and 6 is within the ratio range of from about 1/5 to about 1/40, or better from about 1/10 to 1/25, per unit length of the brush, and preferably about 1/20, however, this ratio is not critical for values greater than 1/40, that is, 1/40 being the practical limit. The relative peripherial speed of the brush generally ranges between about 1.5 to 3.5 meters per second and preferably about 2.5 meters per second but this speed also is not critical. The usual size of the brushes ranges from about 25 centimeters to about 50 centimeters, and preferably about 36 centimeters in diameter and the depth of the tanks employed are rarely greater than about 2 meters, and preferably not over about five times the diameter of the brush. The breadth of the tank may range from 1 to 3 meters and preferably 2 meters, in a direction perpendicular to the axes of the brushes, but their length may be extended to any desired amount limited only by the length of the brushes, and then partitions may be provided in the tanks, as partition 44 in Figs. 1 and 3, so that the tank may contain a plurality of successive chambers and the partitions may be so arranged that the liquid in the tank must pass adjacent the rotating brushes each time it goes from one chamber into the other (see Figs. 4, 7 and 8) to further insure thorough turbulence and aeration of the liquid. The tanks thus form a long trough having the cross-sectional configuration according to the shapes of Figs. 4, 5 or 6.

Referring again to the flow diagram of Fig. 1 after the sewage has been activated in the aeration tank, preferably according to the new method of this invention which takes only between about 30 and 60 minutes, the resulting reacted mixture of sludge and water may pass over the edge 48 along the outlet side of the second and last chamber 43 of tank 40 into a sedimentation tank 90 through a duct 91. In this sedimentation tank 90 the activated sludge from the sewage is settled by gravity and the clear purified water overflows the edges of the tank 90 into the surrounding trough 92, and may be directly discharged through duct 93 into an adjacent stream, river, or canal or may be further treated chemically such as with chlorine, if desired.

The sludge in suspension which settles to the bottom of the sedimentation tank 90 is then withdrawn through pipes 94 and all or a major part of it may be recycled. The pipe 94 is preferably connected to a pump or paddle wheel such as 95, to lift it back and feed it into duct 41 for admixing with the sewage in the flume 32. The same motor 96, which through gear reduction means 97 rotates the brushes 46 and 47, may be geared to drive the paddle wheel 95.

Still other types of aeration tanks may be used according to the process of this invention, which may be substituted for the tank 40 shown in Fig. 1. One form of such a tank 100 is shown in Figs. 7 and 8 (Fig. 8 being a section along line VIII—VIII of Fig. 7) in which a pair of parallel rotating brushes 101 and 102 are provided along opposite sides of a saddle shaped tank (see Fig. 8). In this particular modification, the inlet 103 for the sewage and outlet 104 are shown at the bottom of the tank and three different vertical partitions 105, 106 and 107 are provided across the tank perpendicular to the axes of the brushes, to direct the liquid in the tank into contact with the brushes.

If desired, the aeration tank may be closed, which is particularly advantageous when compressed air, air enriched in oxygen, or oxygen is used as the treating gas. Such a tank 110 similar to that shown in Figs. 7 and 8, is shown in Figs. 9 and 10 which has a cover 113 between the two parallel rotating brushes 111 and 112. In this closed tank, the axes of the brushes are hollow tubes 115 and 116 perforated between the bristles of the brushes, through which perforations the air or oxygen which enters the tank by the duct 114 may escape out through at least one end of the axes of each brush. The liquid inlet and outlet for this tank 110 are shown respectively at 117 and 118, and the tank may, if desired, also be provided with partitions similar to 105, 106 and 107 as in tank 100 of Fig. 7. Such closed tanks have the advantage that no mist or foam escapes to contaminate the surrounding atmosphere, and they also enable pure oxygen to be used, which gas very materially increases the speed of activation, and may prove to be economical in regions where oxygen can be obtained at a low cost.

It has also been found that the efficiency of the brushes of the type described may be increased about 50% if a baffle is mounted adjacent the brushes to further break the foam and froth coming from the rotating brushes. Several types of such baffles are shown in Figs. 11 through 17, in which the rotating brush is designated 120, the surface of the liquid in which the brush and baffle dip is designated 121, and the direction of rotation of the brushes and of the foam from the brushes are designated by arrows. Each of the baffles 122, 123, 124, 125, 128, 131 and 132 are placed at an acute angle to the surface 121 of the liquid and slope toward the brush to be approximately tangent thereto along the full length of the brush. The baffle 122 is the shortest and breaks mainly the liquid stream from the brush in the liquid. The baffle 123 is slightly longer and breaks both the liquid and foam streams from the brush. The baffles 124, 125 and 128 extend to the top of the brush and the latter completely shields the brush. This latter type 128 is the preferred type. The modification in Fig. 15 of the baffle 125 shows an adjustable type of baffle 126 hinged at 127 whereby the angle α may be varied as desired between about 40° and 60°. The distance of the baffle from the brush at its nearest point may vary between about 0.5 and 2.5 centimeters, and preferably about 1 centimeter. The lower end of the baffle in each case is extended below the surface of the liquid 121. The surface of the baffles shown in these Figures 11, 12, 13, 14 and 15 may be continuous or provided with perforations or slits as shown in Figs. 16 and 17, respectively. Such perforated baffles 131 and 132 have a slight advantage, but with these baffles more mist escapes to contaminate the surrounding atmosphere if used in an open tank.

A still further type of aeration tank may be produced in which the cover for the tank may also act as a baffle for the brush. Such a construction is schematically shown for a closed tank 140 in Figs. 18 and 19, in which is mounted one rotating brush 141 having a hollow tubular axis 142. The cover 143 for the tank also acting as a sloping side and baffle, approaches tangentially to the outer side of the brush 141 (see Fig. 19). The air or oxygen may be introduced into this tank through the duct 144 in the top and the spent gas may be withdrawn through the hollow axis 142 of the brush 141. The liquid is shown to enter this tank 140 just below the surface of the liquid in the tank through pipe 145 and flow out at the other end of the tank through pipe 146. Such a tank may be operated under pressure if desired. The depth of such a closed tank is preferably only about one meter but the distance of the baffle side 143 from the periphery of the brush 141 is within the ranges given above for the baffles for open tanks.

Actual tests made on the purification of sewage by aeration and activation in apparatus of the types described and according to the method of this invention are given in the following table. The sewage tested in each case was purified to an extent to which from 90 to 95% of the B. O. D.$_5$ content was removed. Example I in the following table is for activation according to the prior art method in which a large trough type tank was used similar to that shown in Fig. 2 wherein $R=160$ cm. and $\angle\beta=60°$ and the cross sectional area was 12 square meters. The other examples are for sewage of the same type with different shapes and forms of tanks, with and without baffles and with air or oxygen, as indicated in the table.

Table

| Examples | I | II | III | IV | V | VI | VII |
|---|---|---|---|---|---|---|---|
| Tank: | | | | | | | |
| Form | Fig. 2, open | Fig. 5, open | Fig. 5, open | Fig. 5, open | Fig. 6, open | Fig. 2, open | Figs. 18 and 19, closed. |
| Contents | 53 m.$^3$ | 8 m.$^3$ | 8 m.$^3$ | 8 m.$^3$ | 8 m.$^3$ | 53 m.$^3$ | 1.5 m.$^3$ |
| Gas | air | air | air | air | air | air | oxygen. |
| Depth | 3 m | 1¼ m | 1¼ m | 1¼ m | 1 m | 3 m | 1 m. |
| Brush: | | | | | | | |
| length | 4 m | 4 m | 4 m | 4 m | 4 m | 4 m | 2 m. |
| diameter | 36 cm | 36 cm | 42 cm | 42 cm | 36 cm | 36 cm | 36 cm. |
| R. P. M | 148 | 148 | 114 | 114 | 148 | 148 | 148. |
| Immersion in liquid | 8 cm | 8 cm | 11 cm | 11 cm | 8 cm | 8 cm | 8 cm. |
| Baffle type | none | none | none | Fig. 13 | Fig. 13 | Fig. 13 | Fig. 19. |
| Results: | | | | | | | |
| Oxygen capacity— | | | | | | | |
| gms./hr./m.$^3$ | 40.6 | 304 | 265 | 364 | 380 | 48–50 | 1,500–2,000. |
| gms./m.$^3$/kwh | 1,708 | 1,856 | 1,850 | 2,460 | | 2,050–2,150 | |
| Time for activation | 3–6 hrs | ½–1 hr | ½–1 hr | ¾ hr | ¾ hr | 2½–5 hrs | ±¼ hr. |
| Inhabitant-equivalents /m.$^3$ of tank | 15 | 100 | about 90 | 120 | 125 | 18–20 | about 575. |
| Gms. B. O. D.$_5$/24 hrs. removed/m.$^3$ | 500–700 | 3,000–4,000 | about 3,000 | about 4,000 | at least 4,000 | about 700 | 15,000–25,000. |

Since substantially all of the activated sludge was continuously recycled in carrying out these examples, the activated sludge concentration in the sewage treated is many times greater in the smaller size tanks than in the tank of Example I, which sludge quickly reacts with the increased amount of oxygen beaten into the liquid.

From the above table, it can be seen that the oxygen capacity for the liquid according to Example II is many times greater than that for Example I and is at least always more than 100 and can be as great as 350 to 400 g./h./m.$^3$. This corresponds to the removal of at least 2000 grams of B. O. D.$_5$/24 hours per cubic meter of sewage. These oxygenation figures given in the table are calculated on basis of the velocity of oxygen supplied to water at 10° C. at 760 mm., the concentration of the oxygen in the water originally being zero.

Also from the table comparing Examples III and IV, it can be seen that the use of a baffle alone increases the oxygen transfer or capacity between about 25% and 35%.

In Example VII, which is carried out in a closed tank and with undiluted oxygen gas, the results are so many times increased that it can be seen that such a process could even be practical in a region where oxygen could be obtained comparatively cheaply, since it is from about 30 to 50 times more effective than activation according to Example I and at least 5 times more effective than activation according to Example II.

As pointed out in the foregoing description several different combinations of features may be employed in the process and apparatus of this invention without departing from the scope thereof. For example, the employment of a smaller tank, the use of a baffle against a rotating brush, the use of a closed tank, or any combination of two or more of these features, according to any one of the different specific modifications disclosed, may be used to improve any present activated sludge treating process. Although the present description has been directed specifically to the treatment, the aeration process or step and the specific type of apparatus employed therein, may be adapted for the mixing of any type of gas with any type of liquid in an effective, efficient and rapid manner.

While there is described above the principles of this invention in connection with specific apparatus, it is to be clearly understood that this description is made only by way of example and not as a limitation to the scope of this invention.

What is claimed is:

1. A treating tank for mixing an oxygen containing gas with a presettled sewage liquid containing suspended therein activated sludge, said tank having one flat vertical side, a horizontal rotating cylindrical brush mounted near the top of and having an axis parallel with said side so that less than half of said brush may be longitudinally immersed into the surface of the sewage liquid in the tank, a longitudinal baffle mounted in said tank along said brush from below the axis of said brush at an angle upwardly toward tangency with the surface of said brush above the axis of said brush, and means for rotating said brush about its cylindrical axis at a peripheral speed of between 1.5 and 3.5 meters per second whereby the gaseous atmosphere above the surface of the liquid in the tank may be beaten into the liquid and whereby turbulence throughout the liquid in said tank may be maintained, the ratio of the cross sectional areas of said brush to that of said tank being between about 1/5 and 1/40 per unit length of said brush, both taken in the plane perpendicular to the axis of said brush, whereby the time for activation of the sludge in the sewage liquid is not over one hour to remove at least 90% of the B. O. D.$_5$ content of the sewage liquid.

2. A tank according to claim 1 wherein said brush is a metal toothed brush.

3. A tank according to claim 1 wherein the ratio of the cross sectional areas of said brush to that of said tank is between about 1/10 and 1/25.

4. A treating tank for mixing gas with a liquid, said tank having at least one vertical side, a horizontal rotating cylindrical brush mounted near the top of and having an axis parallel with said vertical side, said brush being adapted to be immersed less than ½ its diameter below the surface of the liquid in said tank, means for rotating said brush about its axis whereby a gas above the surface of the liquid may be beaten into the liquid in said tank and whereby turbulence of the liquid in said tank may be maintained, and a longitudinal baffle mounted in said tank along said brush, said baffle extending from below a horizontal plane through the axis of said brush on the opposite side of said brush from said vertical side, upwardly at an acute angle to said horizontal plane toward tangency with the cylindrical surface of said brush above said axis, but spaced from said brush a distance between about the 0.5 and 2.5 cm. at its nearest point to the periphery of said brush, the ratio value of the cross-sectional areas of said brush to that of said tank in the plane perpendicular to the axis of said brush being greater than about 1/40.

5. A tank according to claim 4 wherein the distance of said baffle from said brush is about 1 cm.

6. A tank according to claim 4 wherein said acute angle of said baffle to said horizontal plane is between about 40° and 60°.

7. A tank according to claim 4 wherein said ratio of said cross-sectional areas of said brush to that of said tank is between about 1/10 and 1/25.

8. A tank according to claim 4 wherein said acute angle of said baffle is adjustable.

9. A tank according to claim 4 wherein said baffle extends at least part way over the top of said brush.

10. A tank according to claim 4 wherein said baffle is provided with a plurality of apertures.

11. In a tank having at least one straight side and adapted to contain a liquid to be aerated, a rotating cylindrical brush having a diameter between about 25 cm. and 50 cm., said brush being mounted in said tank with the axis of said brush horizontal and parallel to said straight side of said tank so that less than half of said brush may be immersed in the surface of the liquid to be aerated, and a baffle mounted in said tank parallel to said axis of said brush and extending upwardly at a right angle between about 40° and 60° to a horizontal plane through said axis of said brush from below said axis to approximately tangent to the outer surface of said brush above said axis, but spaced from the outer cylindrical surface of said brush at its nearest point by a distance of between about 0.5 and 2.5 cm.

12. A tank according to claim 11 wherein said brush is a metal toothed brush.

13. A tank according to claim 11 wherein the ratio of the cross-sectional areas of said brush to that of said tank is between about 1/10 and 1/25 per unit length of said brush, both taken in the plane perpendicular to said axis of said brush.

14. A tank according to claim 11 including means for rotating said brush at a peripheral speed of between about 1.5 and 3.5 meters per second.

15. A tank according to claim 11 wherein said brush is mounted on a hollow open ended perforated axle.

References Cited in the file of this patent

UNITED STATES PATENTS

| Number | Name | Date |
|---|---|---|
| 1,343,797 | Stott et al. | June 15, 1920 |
| 1,803,792 | Christensen | May 5, 1931 |
| 1,994,887 | Downes et al. | Mar. 19, 1935 |
| 2,098,152 | Kessener | Nov. 2, 1937 |
| 2,433,884 | Bevan | Jan. 6, 1948 |
| 2,479,403 | Powers | Aug. 16, 1949 |
| 2,540,948 | Jeffery | Feb. 6, 1951 |

FOREIGN PATENTS

| Number | Country | Date |
|---|---|---|
| 545,897 | Germany | Mar. 7, 1932 |
| 799,936 | France | June 23, 1936 |